(12) United States Patent
Sivanadian et al.

(10) Patent No.: US 11,443,488 B2
(45) Date of Patent: *Sep. 13, 2022

(54) SYSTEMS AND METHODS FOR UPDATING A NON-AUGMENTED REALITY DISPLAY WITH USER INTERACTIONS IN AN AUGMENTED REALITY DISPLAY

(71) Applicant: Rovi Guides, Inc., San Jose, CA (US)

(72) Inventors: Kanagasabai Sivanadian, Framingham, MA (US); Theresa Tokesky, Boston, MA (US); Lucas Waye, Cambridge, MA (US); Michael A. Montalto, South Hamilton, MA (US)

(73) Assignee: Rovi Guides, Inc., San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/903,883

(22) Filed: Jun. 17, 2020

(65) Prior Publication Data

US 2020/0380792 A1 Dec. 3, 2020

Related U.S. Application Data

(63) Continuation of application No. 15/972,676, filed on May 7, 2018, now Pat. No. 10,719,988.

(51) Int. Cl.
| | | |
|---|---|---|
| G06F 3/00 | (2006.01) | |
| G06F 13/00 | (2006.01) | |
| H04N 5/445 | (2011.01) | |
| G06T 19/00 | (2011.01) | |
| H04N 21/41 | (2011.01) | |
| H04N 21/231 | (2011.01) | |
| G02B 27/01 | (2006.01) | |

(52) U.S. Cl.
CPC ........ *G06T 19/006* (2013.01); *G02B 27/0172* (2013.01); *H04N 21/23106* (2013.01); *H04N 21/4122* (2013.01)

(58) Field of Classification Search
CPC .............. G06T 19/006; G02B 27/0172; H04N 21/23106; H04N 21/4122
See application file for complete search history.

(56) References Cited

U.S. PATENT DOCUMENTS

| | | | |
|---|---|---|---|
| 10,719,988 B2* | 7/2020 | Sivanadian | H04N 21/8133 |
| 2010/0064306 A1* | 3/2010 | Tiongson | H04N 21/2665 725/24 |
| 2016/0366464 A1* | 12/2016 | Rouady | H04N 21/4758 |
| 2017/0301120 A1* | 10/2017 | Margolin | G06T 11/001 |
| 2019/0118099 A1* | 4/2019 | Payzer | H04N 21/2187 |
| 2019/0266906 A1* | 8/2019 | Lewis | G09B 19/00 |

\* cited by examiner

Primary Examiner — Kyu Chae
(74) Attorney, Agent, or Firm — Haley Guiliano LLP

(57) ABSTRACT

Systems and methods are provided for generating an augmented reality display for users of augmented reality devices. Features provided in the AR displays may be used to update a non-augmented reality display. In addition, interactions in the AR displays may also be incorporated into the non-augmented reality display.

18 Claims, 12 Drawing Sheets

SYSTEMS AND METHODS FOR UPDATING A NON-AUGMENTED REALITY DISPLAY WITH USER INTERACTIONS IN AN AUGMENTED REALITY DISPLAY

CROSS-REFERENCE TO RELATED APPLICATIONS

This application is a continuation of U.S. patent application Ser. No. 15/972,676, filed May 7, 2018. The disclosure of which is hereby incorporated by reference herein in its entirety.

BACKGROUND

Media can be viewed in different environments. Viewing media is often a shared experience that can occur in person or remotely. For example, several friends may watch media together in person, or separately, and communicate about the media. Some viewers may have augmented reality devices that can be used to provide a modified or enhanced version of a media display. For example, certain elements in media may be tailored to a user's preferences to provide a more interesting or exciting experience. In some scenarios, there may be additional information provided to some users, or certain options provided to some users. When viewing media is a shared experience with multiple viewers, any viewers that do not have an augmented reality device may miss some of these enhancements and only see original or base media content. When viewers of augmented reality devices may discuss the enhanced features or have access to additional media content via the augmented reality device, viewers without such content and access may feel that their media experience has been limited. Providing the augmented reality display enhancements to a viewer without an augmented reality device may improve the non-augmented reality viewer's media experience and allow him or her to participate in some of the features of an augmented reality environment.

SUMMARY

The advancement of media devices, in particular, augmented reality ("AR") devices, and connectivity among such devices, as well as digital transmission of media content, has increased the amount of data that can be transmitted from and shared between various devices. Augmented reality is a modified version of reality that can include enhanced information overlaid over views of the real world. The AR views can also be overlaid onto media displays. In general, augmented reality environments can be accessed using dedicated devices such as smart glasses and headsets. Augmented reality environments can also be accessed using an application on a multi-use portable device, such as a smartphone or tablet. The augmented reality environment may access information associated with a media asset to provide enhanced AR features with the media asset. In some scenarios, a media asset may have information ready for use by an AR device. In other scenarios, the AR device may analyze the media images, using a computer or a processor, to identify those that may be relevant or suitable for generating AR content.

When a user does not have an AR device, his or her display screen may be a base or non-augmented reality display. Such types of displays are similar to conventional media displays on televisions, monitors, and other types of screens. Such displays may have typical media features but do not have the enhanced AR features provided by an AR device or application. In some group viewing experiences, for example, on an airplane or bus, or in a movie theater or screening room, media may be displayed on a screen that can be viewed with an AR device. Any viewers without an AR device will simply view the regular screen display. Other viewers that have an AR device or application may view the same screen and be able to see augmented reality features provided by their AR devices or applications. Such features may be theme-based, such as a branded event; other features may be related to the viewer and provide content that is interesting to the individual viewer. For example, in a screening room showing an AR-enhanced movie, special cuts, messages, photos, 3-D characters, or other features may appear in an AR display. Some of those features may be interactive so that the AR user can interact with the features. Sharing those features with the non-AR users may provide an improved media viewing experience to the non-AR device users. For example, the non-AR users may see content that has been tailored to appeal to certain users. In particular, the selected AR featured content may have been tailored to several or a majority of viewers so that it is likely to be interesting and relevant to a larger audience. By sharing such features with the non-AR users, those viewers may be able to see and experience the enhanced features and media content.

Accordingly, to make up for a viewer's lack of AR device or application, AR features may be shared and provided for a non-AR display of media by collecting and analyzing AR features provided in an AR display for the media and overlaying those on the non-AR media display. For example, a media guidance application may be used to retrieve information from AR devices for a media display and detect any AR features and interactions in the AR device that can be applied to the non-AR display. Providing the AR features in the non-AR display can enhance the viewing experience of a viewer without an AR device or application because the non-AR viewer will be able to see in his or her non-AR display additional features and content that has been added to enhance an AR display. The media guidance application may select certain AR enhancements that are viewed or used by several or a majority of AR viewers so that the enhancements can be known to be interesting or relevant to a larger group of viewers.

In an example, a media guidance application may be used to generate a display of media in a non-augmented reality display. The media display may include information associated with a media asset and may be provided in a non-augmented reality display. The display may be generated on any type of display screen such as a television, tablet, mobile device, computer monitor, or other screen. The media guidance application may provide in AR devices, a display of the media. In particular, the media guidance application may provide information about the media asset in an AR display. The AR display may be provided in several AR devices or interfaces. And in each of the AR displays, additional information about the media asset may be provided by the media guidance application based on a user preference for the respective user using the AR device. The media guidance application may retrieve information about the additional information supplied to each of the AR devices to determine a common element of the additional information. For example, the media guidance application may collect information about the features and enhancements supplied in an AR setting to several users and determine which of those features have common elements. Since the additional information is supplied based on each respective user's preferences, each user could have a very different AR display for the same media. However, some elements of each user's AR display may overlap or have common elements. The media guidance application may retrieve information about the AR displays to identify such common elements. When the AR device users interact with the AR devices and the AR feature for the media, such interactions may be retrieved by the media guidance application. For example, in a display of media information about a sporting event, users may see AR features corresponding to their favorite players, and the AR users may seek information about players or game scores, or perform other interactions with the AR features. The interactions performed by the AR users may be analyzed by the media guidance application to identify a common interaction. The media guidance application may then update the base, or non-augmented reality display of information, with the common elements and common interactions that were identified from the AR devices.

In an example, friends may watch a sporting event together and some may have AR headsets or use a smartphone AR application to access AR features for the sporting event. Some of the friends may not have AR devices and so those friends must watch the sporting event in a non-AR display. Each of the users with AR devices or AR applications may have preferences for players and teams in the sporting event, and so each of those users may have an enhanced AR display shown in his or her respective AR device that includes features relevant to the user. A media guidance application may communicate with the AR devices and the non-AR device(s), for example, using a network, to obtain information from each device. The media guidance application may retrieve information from the AR devices to determine which features were added to the AR device displays. If the users interact with the AR devices to select information about the sporting event or players, the media guidance application may also retrieve information about those interactions. The media guidance application may analyze the AR features and interactions for all of the viewers and identify common elements that may appeal to the viewers that do not have AR devices or applications and select those AR features to replace information in the non-augmented reality display of the sporting event. For example, certain players may be highlighted or team colors or mascots may be presented in the non-augmented reality display. In addition, an AR viewer may select that scores or standings are displayed. Such information could be added to a non-AR display. In another example, an AR viewer may select to view a picture-in-picture display of a second sporting event in order to view two games at the same time. Such content could be displayed in the non-AR display. In another example, an AR viewer may select background information, including, for example, links to video clips with outtakes or cast interviews, or text-based information about the cast, which may be displayed in the non-AR display. Such interactions selected by the AR viewer may be added to the non-AR display by the media guidance application in order to provide a more interesting viewing experience to the non-AR viewer. The selected interactions used to update a non-AR display may be ones accessed or used by more than one AR viewer in order to ensure that the interactions are suitable or relevant to a larger audience.

In an illustrative example, methods and systems for displaying information about media content using augmented reality may include retrieving, using control circuitry, from a media database, information associated with a media asset. For example, metadata and details about a media asset may be retrieved by a media guidance application from a media database. The media guidance application control circuitry may be used to generate a non-augmented reality display of the information associated with the media asset. The display may include, for example, the media asset and listings or media information to include with the media asset. Additional displays with AR features for the media asset may be generated by the media guidance application as well. The media guidance application, using control circuitry, may retrieve additional information about the media asset based on user preferences for users of AR devices. The media guidance application may provide in the AR devices an AR display of the information for the media asset including additional information for the media asset that is based on a user preference for the respective user of the AR device. Thus, for a group of AR users, the media guidance application may retrieve information about a media asset that is relevant to each of the AR users based on his or her respective user preferences and generate an AR display for each of the AR users that includes additional information that is relevant to the respective user. The media guidance application may analyze the additional information that is provided for each of the AR users to identify a common element among the additional information. For example, in a television show listing, actor information, pictures of actors, or certain shows may be highlighted within the listings based on a user preference. Each version of the AR-enhanced television show listings in each of the AR devices may include different highlights and features depending on the viewer's preferences for the same television show listings. The media guidance application may analyze the additional information and features provided in the AR displays to identify common elements among the additional information. For example, several displays may highlight one very popular show that is featured for viewers. In another example, some displays may include a picture of a favorite actor that is a favorite of many viewers. Additional information that is a common element for at least two AR displays may be selected using the media guidance application control circuitry. In addition, the media guidance application control circuitry may track interactions by the AR viewers. For example, a viewer may select a television show from the listings to view, select a listing to obtain further information about the show, interact with an actor's avatar in the listing, or select another interaction in the AR display. Such interactions may be detected by the media guidance application using the control circuitry to identify a common interaction across the AR devices. The common interaction and common element identified by the media guidance application may be used to update the non-augmented reality display of information. Thus, common features and interactions used in an AR context may be applied to a non-AR display so that viewers without an AR device or application can experience enhanced features that are seen and used by other viewers of the same base media.

In some scenarios, the interaction with the media information selected as the common interaction may be an interaction that is performed with the information or the additional AR information associated with the media asset by a majority of the AR device users. Interactions that are performed by many AR users may be considered more interesting and relevant to the wider audience of non-AR device users. The interactions may be analyzed by the media guidance application by caching metadata associated with interactions. The metadata for the interactions may include an identifier for the media asset associated with the interaction and a media option for the interaction. Thus, the media guidance application can cache data to analyze which media asset was implicated in the interaction and what action was taken in the interaction. The metadata may be analyzed to identify the interaction based on the media asset as well as the media option. In an example, interactions may be analyzed by what the media is and what the action is. Interactions where users select a viewing media option include the media asset so that even if multiple users are choosing to view media, the interaction needs to occur with respect to the same media asset for it to be considered common among the users. Similarly, an action to seek details about an actor may be tied to the media asset.

A common AR element identified by the media guidance application to apply in an update to a non-augmented reality display may be selected based on an element of additional information that is supplied to a majority of the AR users of the AR devices. For example, if a majority of the AR users have a preference for a particular television show and program listings including the show highlight the particular show, that common element of highlighting the show may be selected as a common element used to update a non-AR display. The media guidance application may select the common element by analyzing metadata for the additional information supplied to each of the respective AR devices. In some scenarios, the media guidance application may check that the common element is suitable for general audiences. For example, in an environment on an airplane or bus, or in a public forum, the common element should not be one that is not suitable for all eyes. The media guidance application control circuitry may retrieve metadata associated with the common element to identify a parental control rating for the common element. If the element of additional information has a parental control rating for a general audience and has been provided for a majority of the users of the AR devices, it may be selected as the common element to apply to the non-augmented reality display. In another scenario, there may be multiple elements of additional information supplied to the AR devices. In this case, the media guidance application control circuitry may cache metadata associated with the additional information provided for each of the AR displays. The metadata may be analyzed to identify a characteristic of the additional information and the media asset. For example, the media guidance application may analyze the metadata for the additional information to determine whether it is, for example, related to a cast member for a show, a team or player in a sporting event, or other category of information that has been added to an AR display based on a user preference. The characteristic of the additional information may be helpful in determining which of the additional AR features is most broadly interesting to the majority of the viewers. Thus, in some scenarios, a common element may be selected if it is used for the same characteristic in a majority of the AR displays.

Once the common element and common interactions are identified by the media guidance application from the AR device displays, the media guidance application may update the non-AR display with the common element and common interaction by replacing in the non-AR display a portion of information associated with the media asset with the common element and adding the common interaction to the main display. In an example, for a non-AR display of program listings, the display may be replaced with information about a television show or actor that has appeared as a common feature in the AR displays. In addition, the common interaction in the AR displays, such as a way to select a program, may also be added to the non-AR display. The update to the non-AR display may be provided by generating a picture-in-picture window in the non-augmented reality display that overlays a main display, and includes updates to the information associated with the media asset, for example, the common element and/or the common interaction.

In another illustrative example, the media guidance application may provide the AR devices using user preference information. The media guidance application may receive a first user profile for a first user of the AR devices, and a second user profile for a second user of the AR devices. Metadata for the media asset may also be retrieved by the media guidance application. Information about a media asset may be displayed in a non-AR device, including information about the media asset for a category of metadata. For example, in program listings, a non-AR display may include a category of actor information for the programs. The media guidance application may compare the user profiles to identify preferences for the category of information, for example a favorite actor of the respective user. The media guidance application may compare the metadata for the media asset and the user profile to identify a characteristic for the category of metadata that matches the user profile. The media guidance application may repeat this step for all users of the AR devices that have user preferences to find suitable characteristics for additional information to include with the media information in each user's AR display. The media guidance application may then generate an AR display of information for each respective user comprising an element of additional information for the category of metadata based on the characteristic.

The AR displays for each user may have additional information relevant to the particular user. In addition, the AR displays may include avatars and animations that may be suited to the user and/or the media asset. In an example, the media guidance application may receive a selection of the media asset. The selection may be, for example, to view or otherwise interact with the media asset. The media guidance application may determine a characteristic of the media asset. The media asset characteristic may be obtained from metadata for the media asset. The characteristic may be used as a basis for generating a suitable selection avatar or selection animation for interacting with the media asset. Thus, the media guidance application may display in the non-AR display of information, a selection avatar for the media asset based on the characteristic of the media asset. In an example, a hockey sporting event may have a selection cursor in the shape of a hockey puck and selecting the hockey game may cause a hockey stick to shoot the puck at the listing. In another example, a singing program may be selected with a cursor that is shaped like a microphone and musical elements may emit from the listing when it is selected. Other types of relevant avatars and animation sequences may be used for other types of listings or media assets.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Accordingly, systems and methods are described herein for enhancing a viewer's media consumption experience when a viewer does not have an augmented reality ("AR") device. Augmented reality devices may be used to view objects, including media, and other views, with enhanced features overlaying the view. The enhanced features may be added that are interesting and relevant to both the user and relevant to the base objects in the media. In a media viewing environment, additional information about the media may be supplied in an AR display. Since AR devices can be connected to other networked devices, information displayed in an AR device may be shared and analyzed to find common elements that may be suitable and interesting to a general or wider audience to add to a non-AR device.

Figure 1:
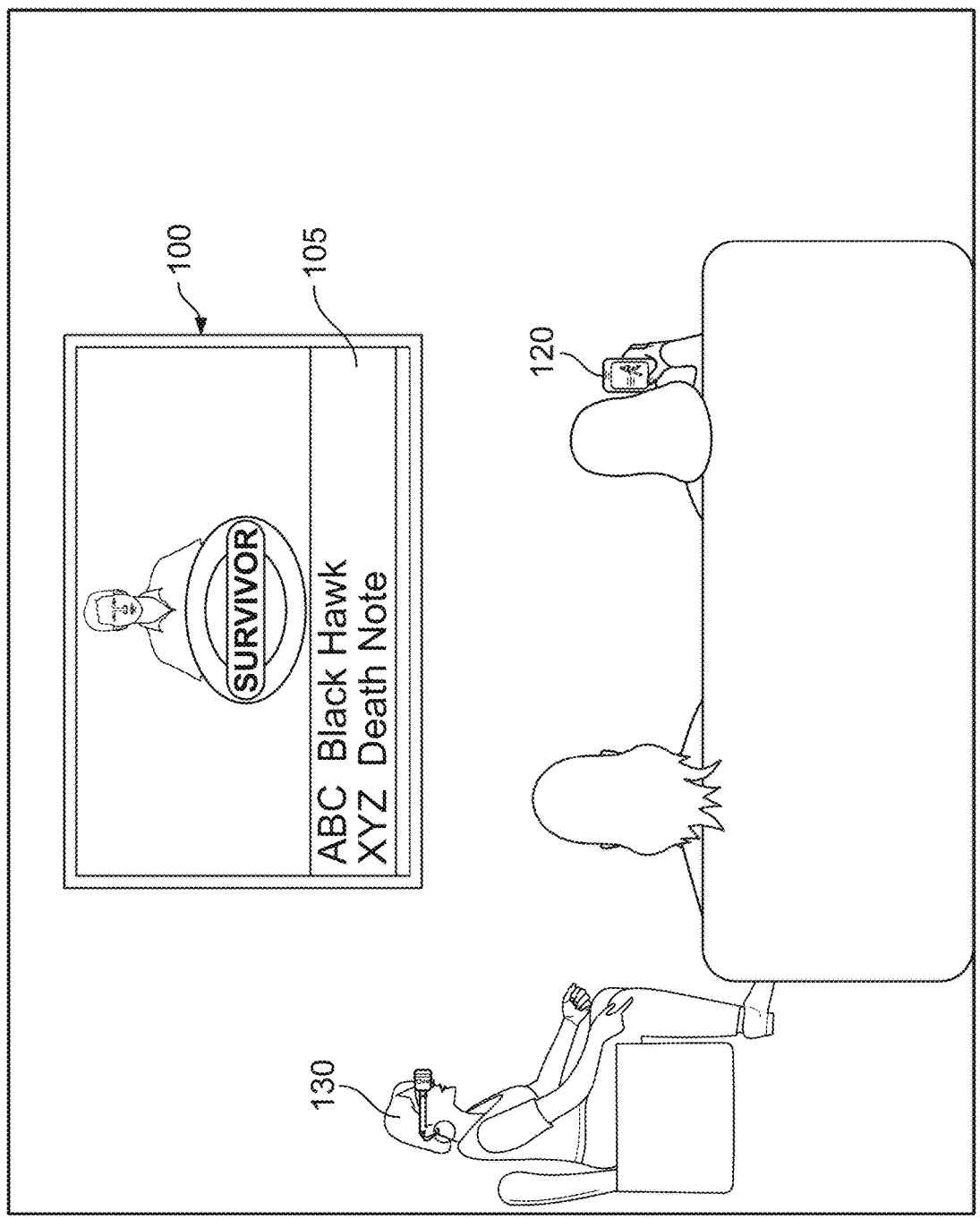
FIG. 1 shows an illustrative example of an environment in which a media consumption activity may occur with multiple users, in accordance with some embodiments of the disclosure.

An example environment for showing AR media is depicted in FIG. 1. As shown, a group of viewers may watch a display screen 100, such as a television screen. The screen may include program listings 105 for media items. The screen 100 may include a display of a program, such as the reality show "Survivor." The screen 100 may be in a household, office, community room or other place where people may gather to view media. Some of the people watching the screen 100 may have AR devices, such as an AR application implemented on a smartphone, or an AR headset 130. Other types of AR devices could also be implemented to provide the features described herein. The base display shown in screen 100 may be viewed by the viewer without an AR device at the same time that the other viewers are viewing enhanced versions of display screen 100 using the respective AR devices 120 and 130. The viewer without the AR device may not have the same viewing experience as the viewers with the AR devices who may be able to see additional details about the programs in the listings, and have features and highlights that are added to the view to appeal to the particular viewer using user preference information. Other examples of environments that may be suitable for the features described herein may be an airplane, bus, or screening room, where a captive audience may view one or more screens. The features may also be applied in a scenario where there are multiple viewers watching media but each of the viewers may be remote to the others, but connected, for example, in a community group, or other Internet-based forum. For example, friends that may be located in various places may wish to watch a sporting event together (but separately in their homes), and have a shared experience where friend's AR devices may contribute to an experience of a friend without an AR device.

Figure 2:
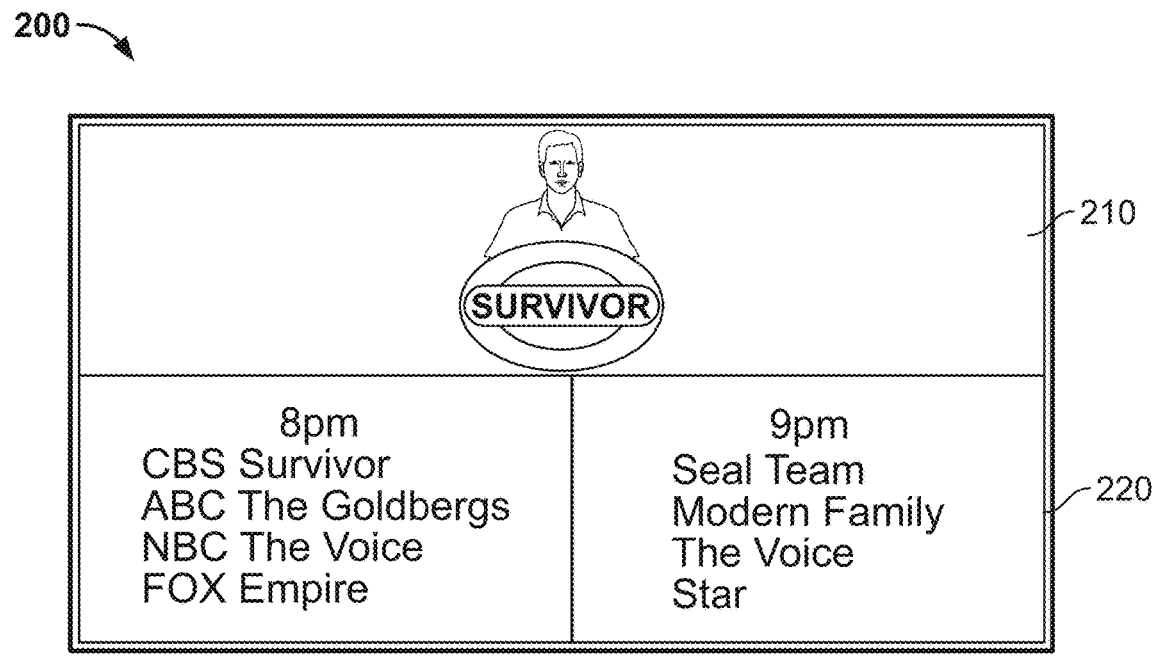
FIG. 2 shows an illustrative example of media listings in accordance with some embodiments of the disclosure.

An example of typical program listings in a non-AR display may be those as shown in FIG. 2. FIG. 2 shows a display screen 200 which includes an area 210 for displaying a program and an area for program listings 220. The display screen 200 is simplified to show program listings 220 but could include other media information typically provided in a media interface. Media options for interacting with the program listings 200 and in the screen 200 may also be provided. The screen 200 may be any type of display screen such as a television, monitor, projector or other display. The display 200 may be generated using a media guidance application and may be connected via a network, such as a home network, to receive media data and other information. As shown in FIG. 2, the media listings may include programming for evening shows on several channels.

Figure 3:
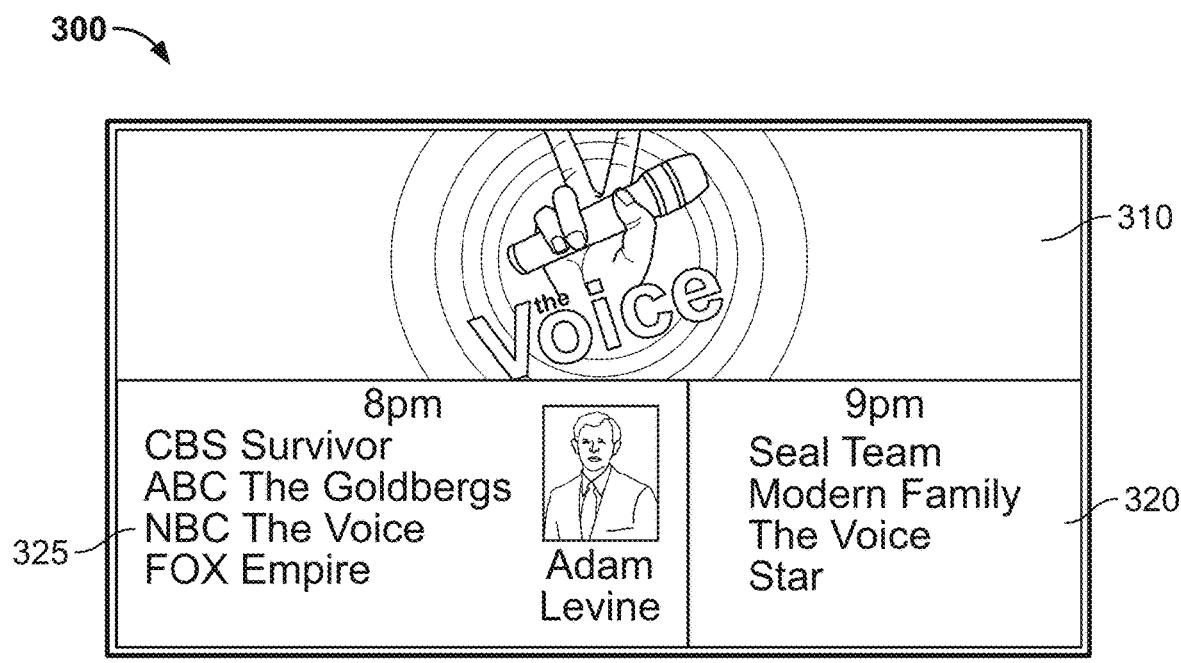
FIGS. 3-4 show illustrative examples of media listings in an augmented reality environment in accordance with some embodiments of the disclosure.

The program listings from FIG. 2 may be enhanced in an AR display with the view depicted in FIG. 3. As shown in FIG. 3, a display screen 300 may include information similar to what was shown in FIG. 2 in a base display, however, the AR version may include details that are relevant to the user of an AR device. For example, a user that enjoys the television show "The Voice" may see an image 310 in his or her AR display and include additional details in the program details 320 about "The Voice" 325, including reference to one of the cast—Adam Levine, with his picture. A media guidance application may retrieve a user's preference profile and determine that, of the shows included in the program listings 320, the user likes "The Voice" and Adam Levine and thus may cause the AR device to supply additional information related to the program listing that may appeal to the user. The additional information may be obtained from a media database that may have metadata and information about media listings and other media assets. The AR display shown in FIG. 3 may be shown in a user's AR headset or on a portable AR device, such as a smartphone. Interactions with the AR display 300 may include various media interactions, such as selecting a program listing to obtain additional information about a program, as well as view, save, store, add to a watchlist or another media interaction. The interactions with the AR displays may be stored by the AR device or media guidance application. Although the AR display in FIG. 3 is shown as a single screen 300, it may be the same view seen by multiple AR users who may have the same or similar user preferences.

Figure 4:
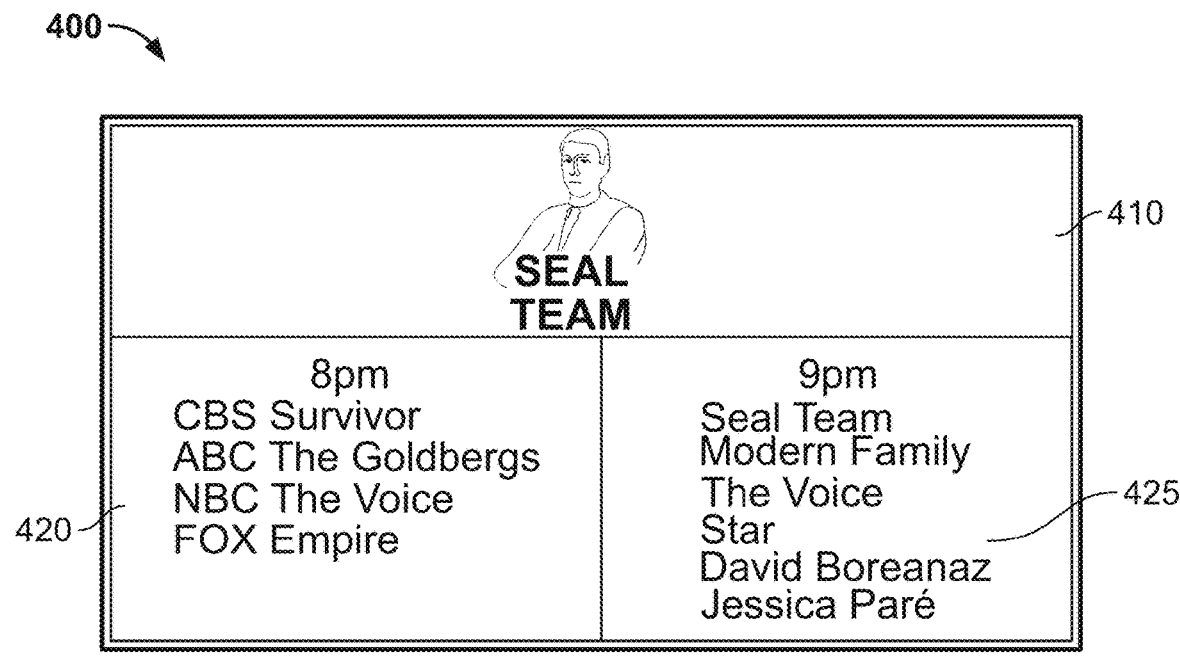

In another example, FIG. 4 depicts another AR display for the program listings from FIG. 2 for another user. Since another user's preference profile may show different interests, the same program listings may be shown in another format for another user. As shown in FIG. 4, a display screen 400 may include information highlighting another user's preferred or featured show—"Seal Team." The display screen 400 may include an image 410 of the show "Seal Team" and include in the program listings 420 additional details about the show "Seal Team" with cast information 425. The additional information may be obtained by a media guidance application from a media database that may have metadata and information about media listings and other media assets. Other features and information relevant to the user could also be shown in the AR display. The AR display shown in FIG. 4 may be shown in a user's AR headset or on a portable AR device, such as on a smartphone. Interactions with the AR display 400 may include various media interactions, such as selecting a program listing to obtain additional information about a program, as well as view, save, store, add to a watchlist or another media interaction. The interactions with the AR displays may be stored by the AR device or media guidance application. Although the AR display in FIG. 4 is shown as a single screen 400, it may be the same view seen by multiple AR users who may have the same or similar user preferences. When the same AR features are shown in several viewers displays, the media guidance application may determine that those features are interesting and relevant to a larger audience. In some scenarios, a media guidance application may have access to AR user data that can be anonymous and linked to media content and aggregated to discover common AR features used for the media content that may be suitable for adding to a non-AR screen. The ability to aggregate features from groups of viewers may be helpful when a non-AR viewer's community of AR viewers watching the same content may be limited. However, in order to ensure that the larger group of AR user data is relevant to a non-AR viewer, the media guidance application may select AR features viewed and accessed by a majority of the AR viewers, and, in some instances, a majority of AR viewers having some viewer characteristics in common with the non-AR viewer; or, if the non-AR viewer is unknown, then characteristics for a typical user may be used.

Figure 5:
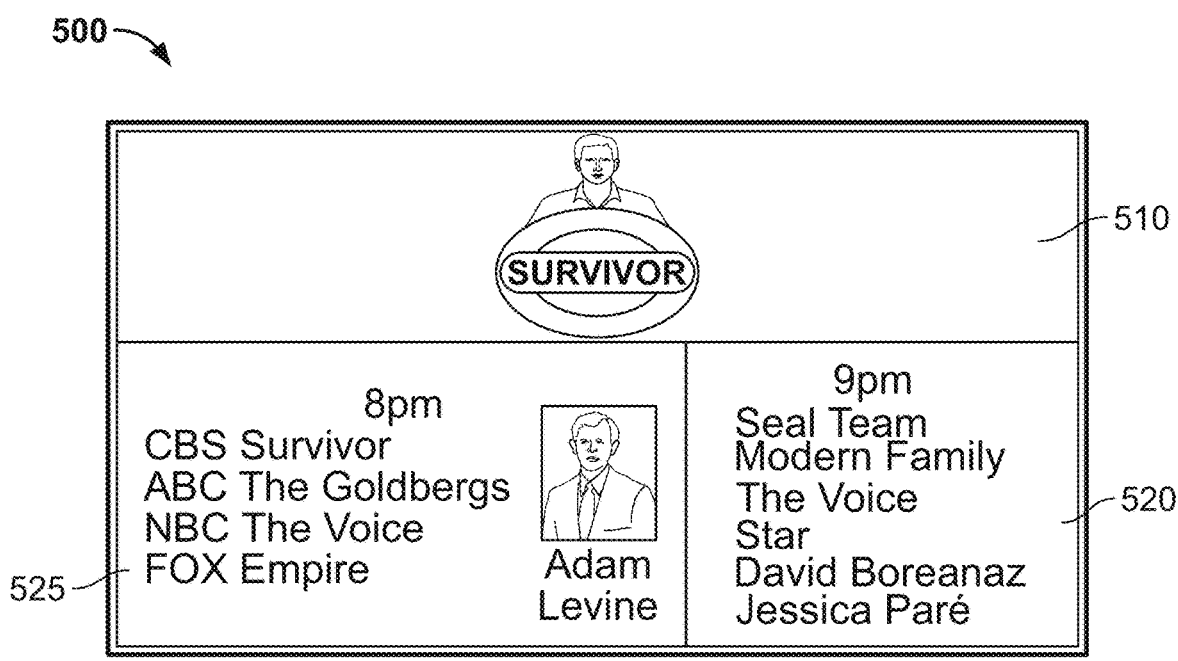
FIGS. 5-7 show illustrative examples of updated media listings in accordance with some embodiments of the disclosure.

FIG. 5 shows an example of a non-AR display that is updated to include features from AR displays. In FIG. 5, the display screen 510 includes the program listings and information from FIG. 2, the base display, including, for example, the "Survivor" show having an image or clip in area 510 and program listings 520. However, the program listings 520 have been updated to include the features and additional details from FIGS. 3 and 4, the additional details about "Seal Team" and "The Voice." In some scenarios, it may be confusing to have so much unrelated additional information supplied in the non-AR display because there is no context for the users to see the additional information. Therefore, selected additional information may be supplied to the non-AR display instead.

Figure 6:
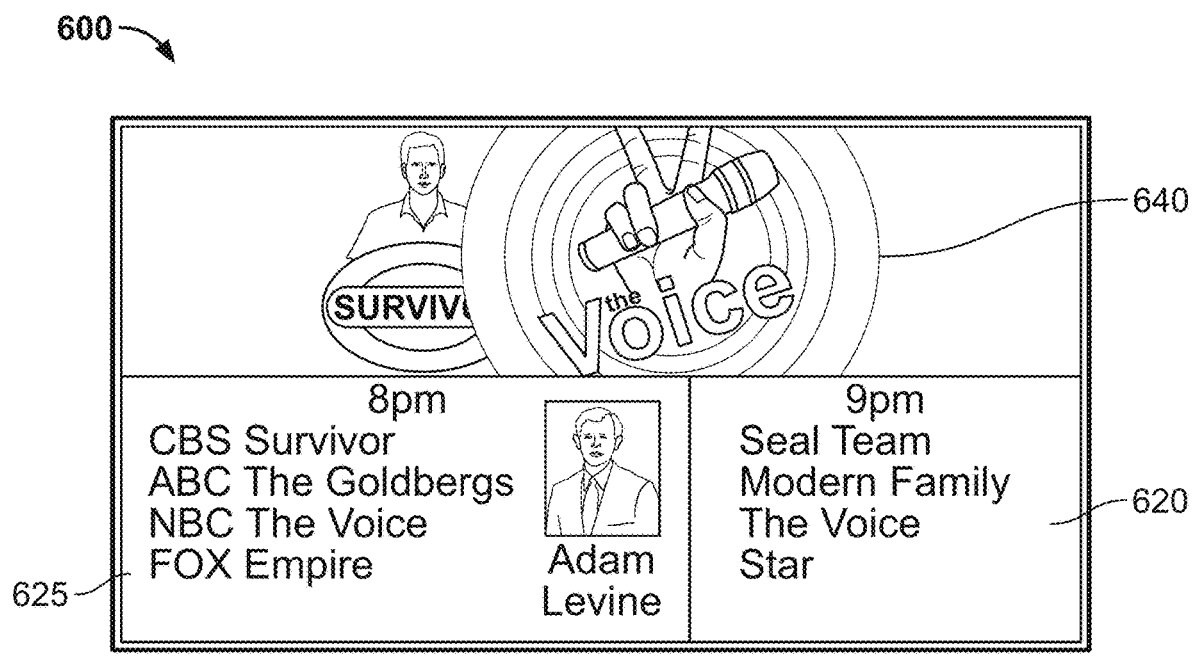

Turning to FIG. 6, an illustrative display of another updated non-AR display screen 600 may include selected AR features. As shown, the program listings 620 may include additional details about the show "The Voice" and include Adam Levine's picture 625. This additional information may be added to the non-AR display. The display 600 may also include an overlay of an image related to "The Voice" 640. The images and information added to the AR device may be obtained from a media database of information and metadata by a media guidance application. The same information may be used by the media guidance application to apply to the non-AR display. Although only two examples of AR display screens are depicted in FIGS. 3 and 4, such screens may be shown to several users. When multiple viewers are shown the same enhanced AR content, the AR content may be selected to be shared in the non-AR display. Any interactions that may have been performed with the AR displays may be provided in the non-AR display. For example, if a user using an AR device, selects from an AR display, a program listing to obtain further information, the information could be displayed in the non-AR display. In another example, if a user using an AR device, selects in an AR display, a program listing to view a program, such program may be highlighted in the non-AR display update.

Generally speaking, updates to the non-AR display may include elements and interactions from the AR displays that are included in a majority of displays. This may be helpful in limiting the number and types of updates to the non-AR display to only the elements and interactions that are most common and which may be most broadly appealing to a general audience.

Figure 7:
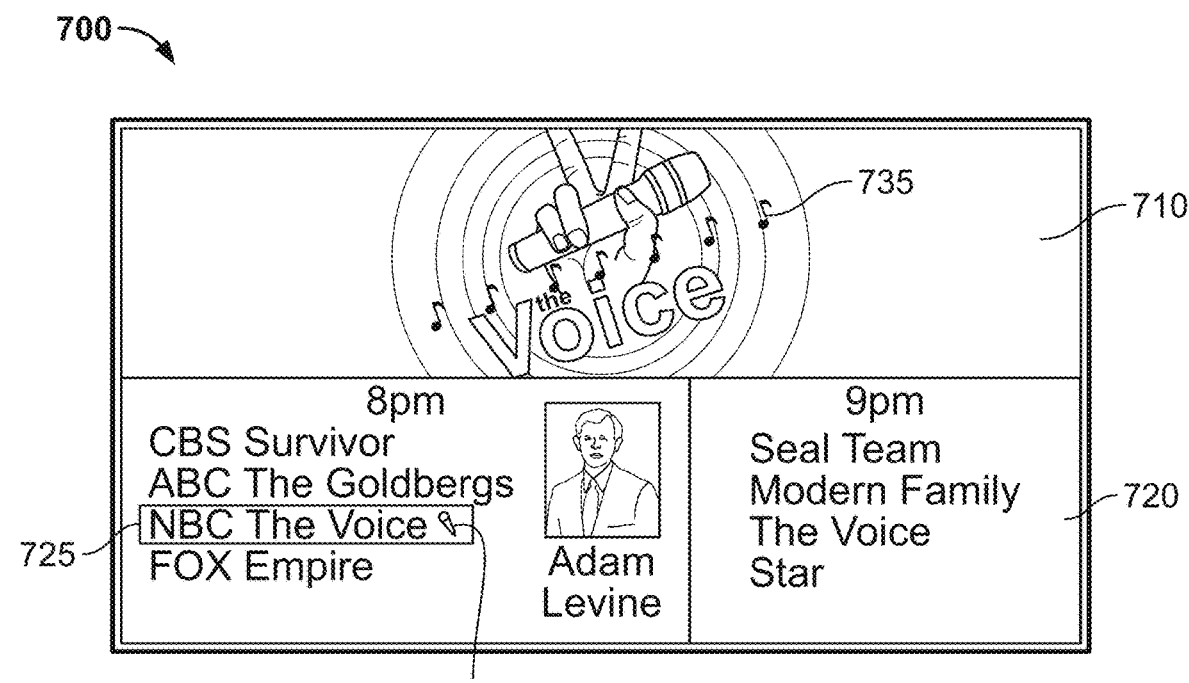

Metadata used to supply information about media assets and program listings may include information about the media asset indicating, for example, a category or theme of the media asset or program listing. The metadata may be used by the media guidance application to provide a relevant avatar or selection animation. As shown in FIG. 7, an updated non-AR display screen 700 may include a program image 710 showing a selected show "The Voice." Program information 720 may include the elements from the additional information 725 shown in the AR displays (FIG. 3) for Adam Levine. The selection of the show "The Voice" may be made, for example, based on an interaction in an AR display. In addition, the show "The Voice" may have associated metadata that indicates that it is a show related to singing and music, and so the media guidance application may determine this connection and use a special selection symbol—microphone 730—that is relevant to the show to use to select the show. When the show is selected, a music-related animation, such as a trail of music notes 735, may appear so that the viewer knows that the show is selected and will be displayed on the screen. Such specialized symbols and animations may be interesting for the user to see and also be a visual cue that the show they selected will display. In another example, if a viewer selects a sporting event, the team icon could be used as a symbol or selection cursor to select the event, and when selected, a hockey puck or soccer ball could be shown moving towards a goal. In another example, for a horror movie, an ax could be used to hack at the listing. Other examples of related animations and symbols could be used based on metadata for the media item.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 8:
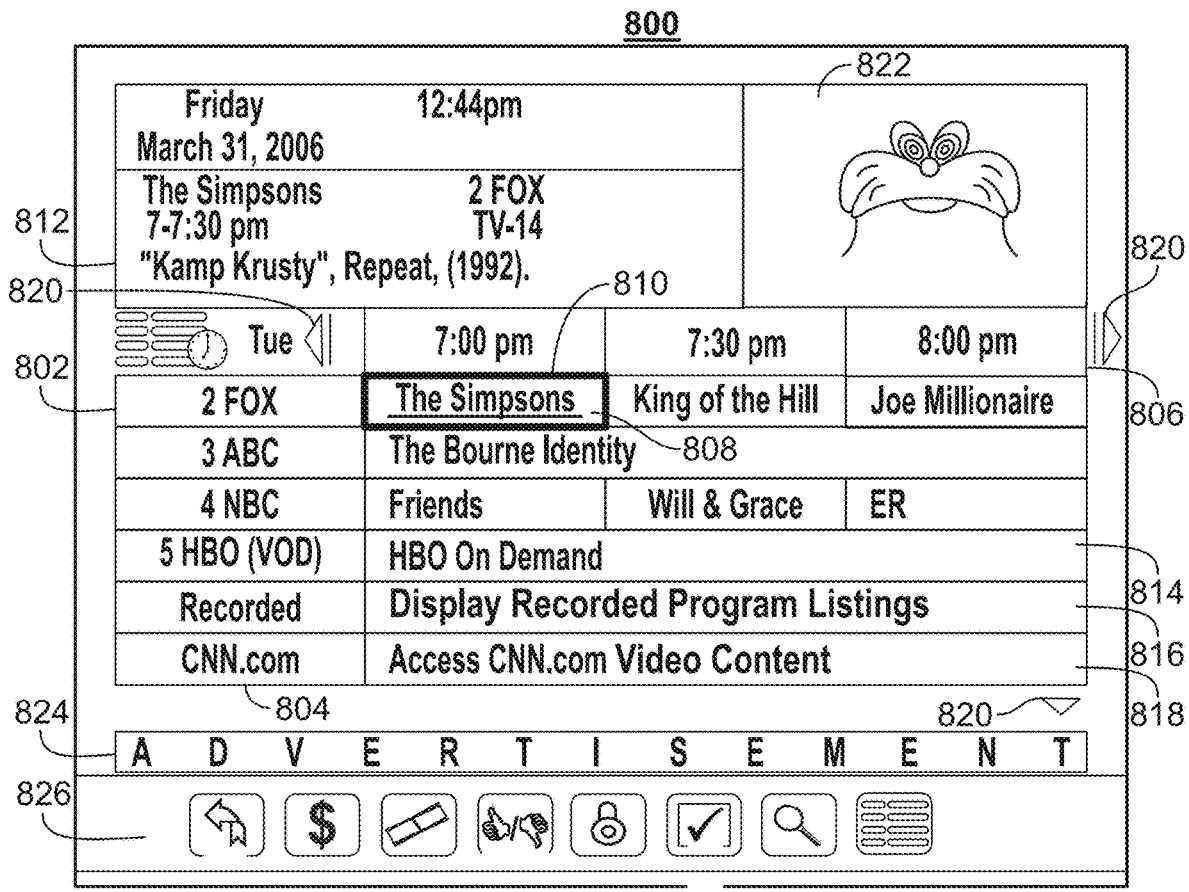
FIGS. 8-9 show other illustrative examples of display screens generated by a media guidance application in accordance with some embodiments of the disclosure.
Figure 9:
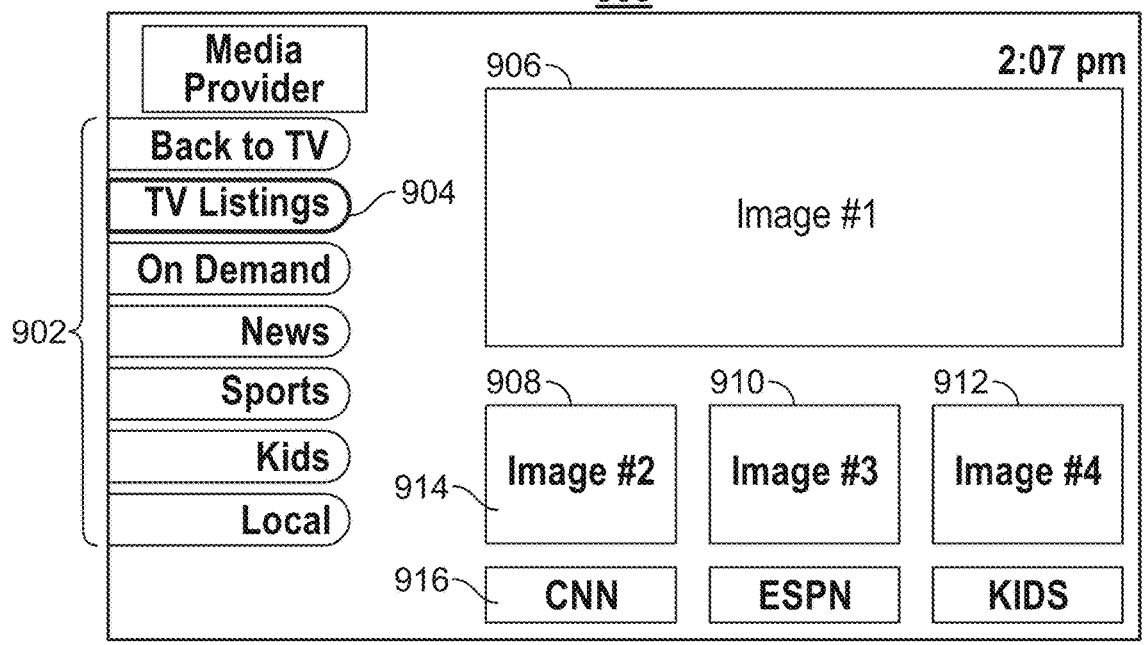

FIGS. 8-9 show illustrative display screens that may be used to provide media guidance data. The display screens shown in FIGS. 8-9 may be implemented on any suitable user equipment device or platform. While the displays of FIGS. 8-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listing's associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 826. Video region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 900, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (i.e., listing 906 is larger than listings 908, 910, and 912), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 10:
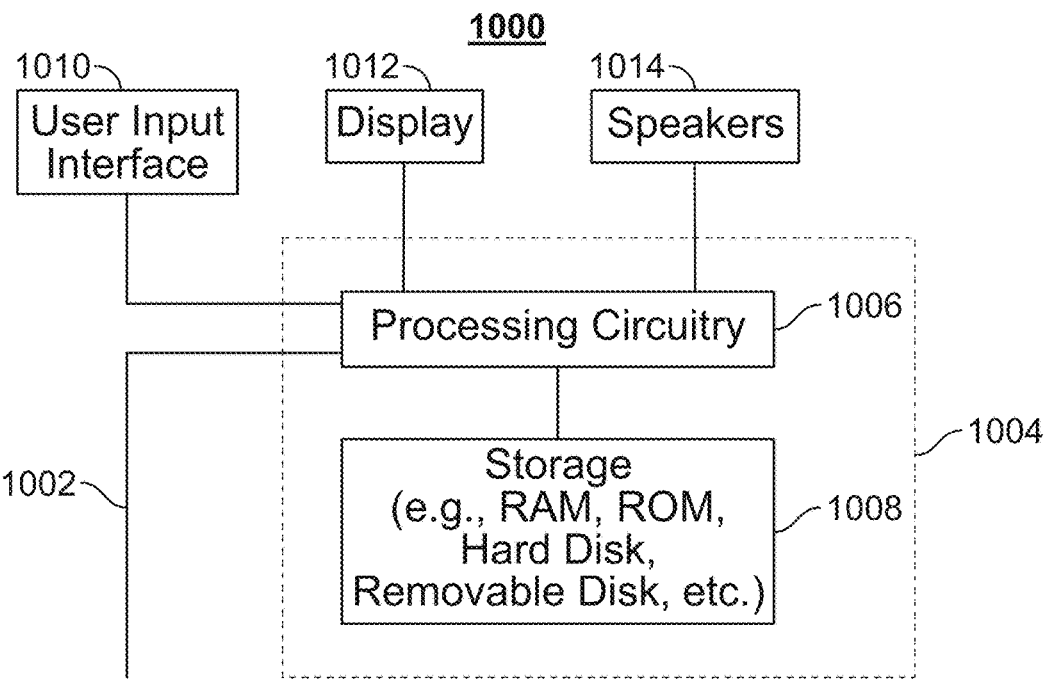
FIG. 10 is a block diagram of an illustrative user equipment device in accordance with some embodiments of the disclosure.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (i.e., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 11, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 11:
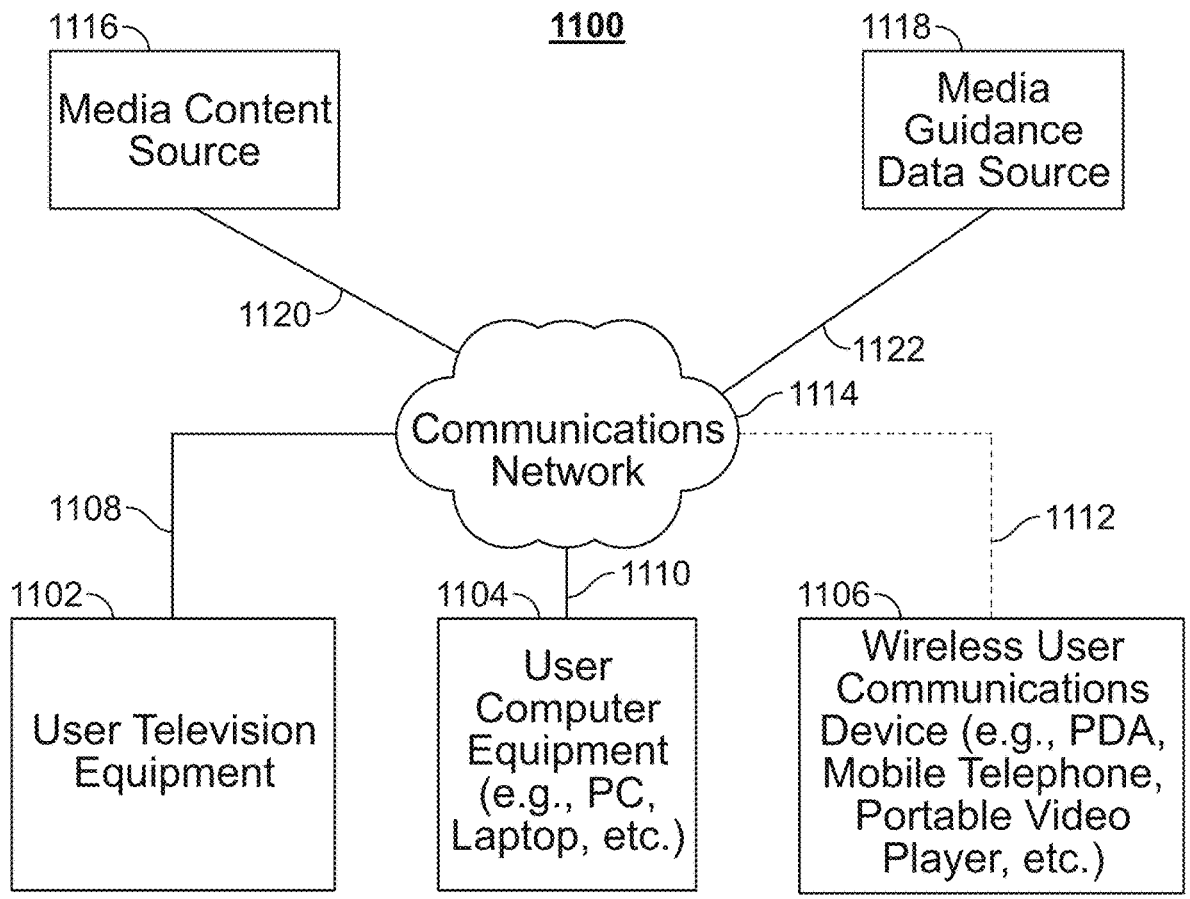
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1118 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a "Survivor" model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 12:
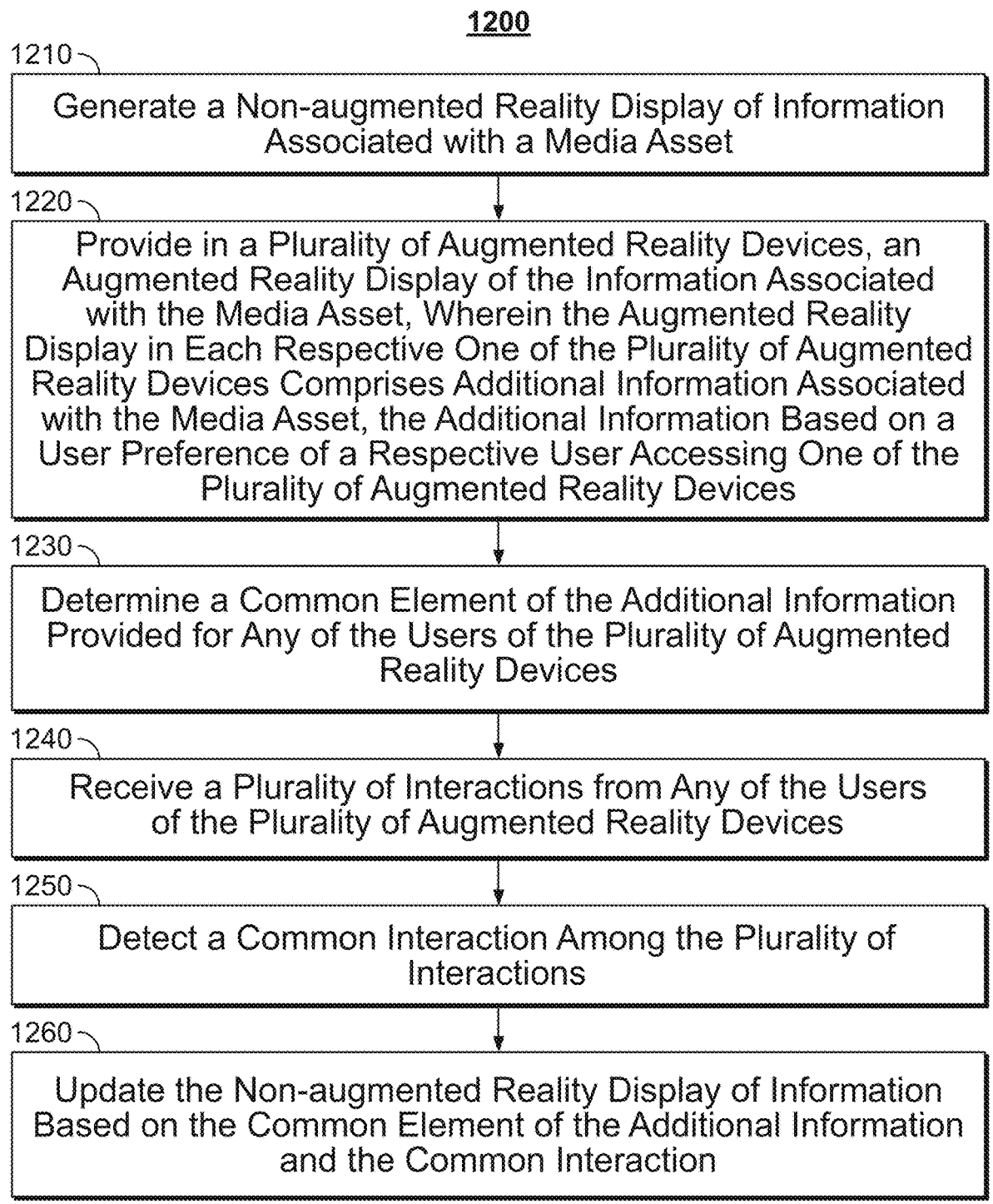
FIG. 12 is a flowchart of an illustrative process for updating a non-augmented reality device display in accordance with some embodiments of the disclosure.

FIG. 12 is a flowchart of illustrative steps of a process 1200 for updating a non-augmented reality display in accordance with some embodiments of the disclosure. It should be noted that process 1200 or any step thereof could be performed on, or provided by, any of the devices shown in FIGS. 10-11. For example, process 1200 may be executed by control circuitry 1004 (FIG. 10) as instructed by a media guidance application implemented on a user device (e.g., user equipment devices 1102, 1104, and/or 1106 (FIG. 11)) to update a non-augmented reality display. In addition, one or more steps of process 1200 may be incorporated into or combined with one or more steps of any other process or embodiment described herein.

FIG. 12 depicts a process 1200 for updating a non-augmented reality device. For example, in the viewing environment shown in FIG. 1, the display screen 100 may be updated using elements from an AR display, such as those shown in device 120 and 130, so that the viewer or viewers of a non-AR device may experience some of the enhancements viewed by AR device viewers.

At step 1210, control circuitry 1004 for a media guidance application may be used to generate a non-augmented reality display of information associated with a media asset. For example, as shown in FIG. 2, program listings 220 may be shown in a display 200 in a non-augmented reality display.

At step 1220, the control circuitry 1004 for the media guidance application may also provide, in augmented reality devices, an augmented reality display of the information associated with the media asset. For example, the control circuitry 1004 for the media guidance application may generate a display of information, such as program listings shown in FIGS. 2 and 3. The control circuitry 1004 for the media guidance application may retrieve user preference information for the user of the AR device to obtain additional information to include in the respective AR display. Thus, the viewer of an AR device can see user-specific features for program listings, e.g., as shown in FIGS. 3 and 4.

At step 1230, the control circuitry 1004 for the media guidance application may determine a common element of the additional information provided for any of the users of the AR devices. For example, the control circuitry 1004 for the media guidance application may retrieve details about the additional information used to enhance the AR displays, e.g., 325 (FIG. 3) and 425 (FIG. 4).

At step 1240, the control circuitry 1004 for the media guidance application may receive information about interactions from any of the users of the AR devices. Interactions with the AR device displays may include selections by a user to obtain information about program listings, or information about an actor mentioned in the listing, viewing a clip associated with a listing, accessing the program, or performing another media operation in the AR environment.

At step 1250, the control circuitry 1004 for the media guidance application may detect a common interaction among the plurality of interactions in the AR devices. For example, multiple users may perform several interactions in their respective AR environments with one or more elements in the environment. Such interactions may be cached and analyzed by the control circuitry 1004 for the media guidance application to identify a common interaction.

At step 1260, the control circuitry 1004 for the media guidance application may update the non-augmented reality display of information based on the common element of the additional information and the common interaction. Thus, the non-AR display, such as that shown in FIG. 2, may be updated to include common features, elements and interactions from other AR devices, such as those shown in FIGS. 6-7. Providing such updates to a non-AR display allows a user without an AR device to experience the enhanced features from an AR device. In addition, updating the non-AR display with common features helps ensure that the features added to the non-AR display are broadly appealing to most audiences.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 12.

Figure 13:
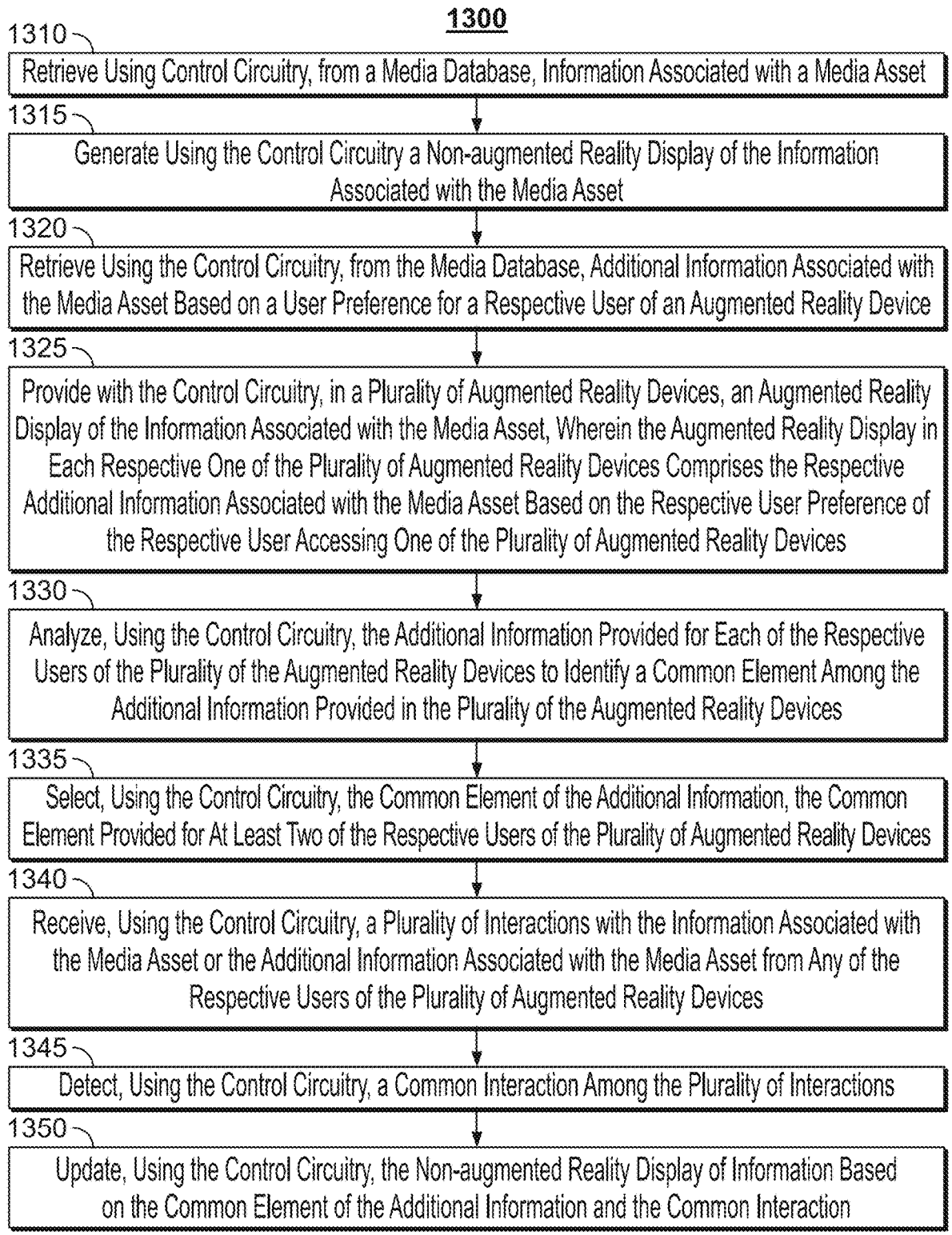
FIG. 13 is a flowchart of an illustrative process for updating a non-augmented reality device display in accordance with some embodiments of the disclosure.

FIG. 13 is a flowchart of illustrative steps of a process 1300 for updating a non-augmented reality display in accordance with some embodiments of the disclosure. It should be noted that process 1300 or any step thereof could be performed on, or provided by, any of the devices shown in FIGS. 10-11. For example, process 1300 may be executed by control circuitry 1004 (FIG. 10) as instructed by a media guidance application implemented on a user device (e.g., user equipment devices 1102, 1104, and/or 1106 (FIG. 11)) to update a non-augmented reality display. In addition, one or more steps of process 1300 may be incorporated into or combined with one or more steps of any other process or embodiment described herein.

FIG. 13 depicts a process 1300 for updating a non-augmented reality device. For example, in the viewing environment shown in FIG. 1, the display screen 100 may be updated using elements from an AR display, such as those shown in device 130 and 130, so that the viewer or viewers of a non-AR device may experience some of the enhancements viewed by AR device viewers.

At step 1310, control circuitry 1004 for a media guidance application may be used to retrieve, from a media database, information associated with a media asset. The information associated with a media asset may include any type of media data and metadata from a media database. For example, program listing details may include times, channels, sources, cast, program descriptions, and other details. Media assets may also have associated information, such as players, teams, cast, directors, genres, and other categories of information.

At step 1315, the control circuitry 1004 for the media guidance application may be used to generate a non-augmented reality display based on the information associated with a media asset. For example, as shown in FIG. 2, program listings 220 may be shown in a display 200 in a non-augmented reality display.

At step 1320, the control circuitry 1004 for the media guidance application may retrieve, from the media database, additional information associated with the media asset based on a user preference for a respective user of an augmented reality device. The media database may include specific information that is related to user preference information for a user of an AR device.

At step 1325, the control circuitry 1004 for the media guidance application may provide, in a plurality of augmented reality devices, an augmented reality display of the information associated with the media asset. For example, the control circuitry 1004 for the media guidance application may retrieve user preference information for the user of the AR device to obtain additional information to include in the respective AR display. Thus, the viewer of an AR device can see user-specific features for program listings, e.g., as shown in FIGS. 3 and 4. The AR display may include respective additional information associated with the media asset that is relevant and tailored for the user of the AR device.

At step 1330 the control circuitry 1004 for the media guidance application may analyze the additional content supplied to the AR devices. In particular, the control circuitry 1004 for the media guidance application may analyze the additional information provided for each of the respective users of the plurality of the augmented reality devices to identify a common element among the additional information provided in the plurality of the augmented reality devices. That is, the control circuitry 1004 for the media guidance application may retrieve the additional information included in the AR devices to identify common elements supplied in the AR devices. For example, if more than one of the AR devices has the same types of additional information added for the users, such information may be considered to be a common element.

At step 1335, the control circuitry 1004 for the media guidance application may select, using the control circuitry, the common element of the additional information, the common element provided for at least two of the respective users of the plurality of augmented reality devices. Ideally, a common element may be one that is provided in multiple or a majority of AR devices. Having broad use may indicate that a common element will be interesting and appealing to a larger audience.

At step 1340, the control circuitry 1004 for the media guidance application may receive interactions with the information associated with the media asset or the additional information associated with the media asset from any of the respective users of the plurality of augmented reality devices. Interactions with the AR device displays may include selections by a user to obtain information about program listings, or information about an actor mentioned in the listing, viewing a clip associated with a listing, accessing the program, or performing another media operation in the AR environment.

At step 1345, the control circuitry 1004 for the media guidance application may detect a common interaction among the plurality of interactions in the AR devices. For example, multiple users may perform several interactions in their AR environments with one or more elements in the environment. Such interactions may be cached and analyzed by the control circuitry 1004 for the media guidance application to identify a common interaction.

At step 1350, the control circuitry 1004 for the media guidance application may update the non-augmented reality display of information based on the common element of the additional information and the common interaction. Thus, the non-AR display, such as that shown in FIG. 2, may be updated to include common features, elements and interactions from other AR devices, such as those shown in FIGS. 6-7. Providing such updates to a non-AR display allows a user without an AR device to experience the enhanced features from an AR device. In addition, updating the non-AR display with common features helps ensure that the features added to the non-AR display are broadly appealing to most audiences.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 13.

Figure 14:
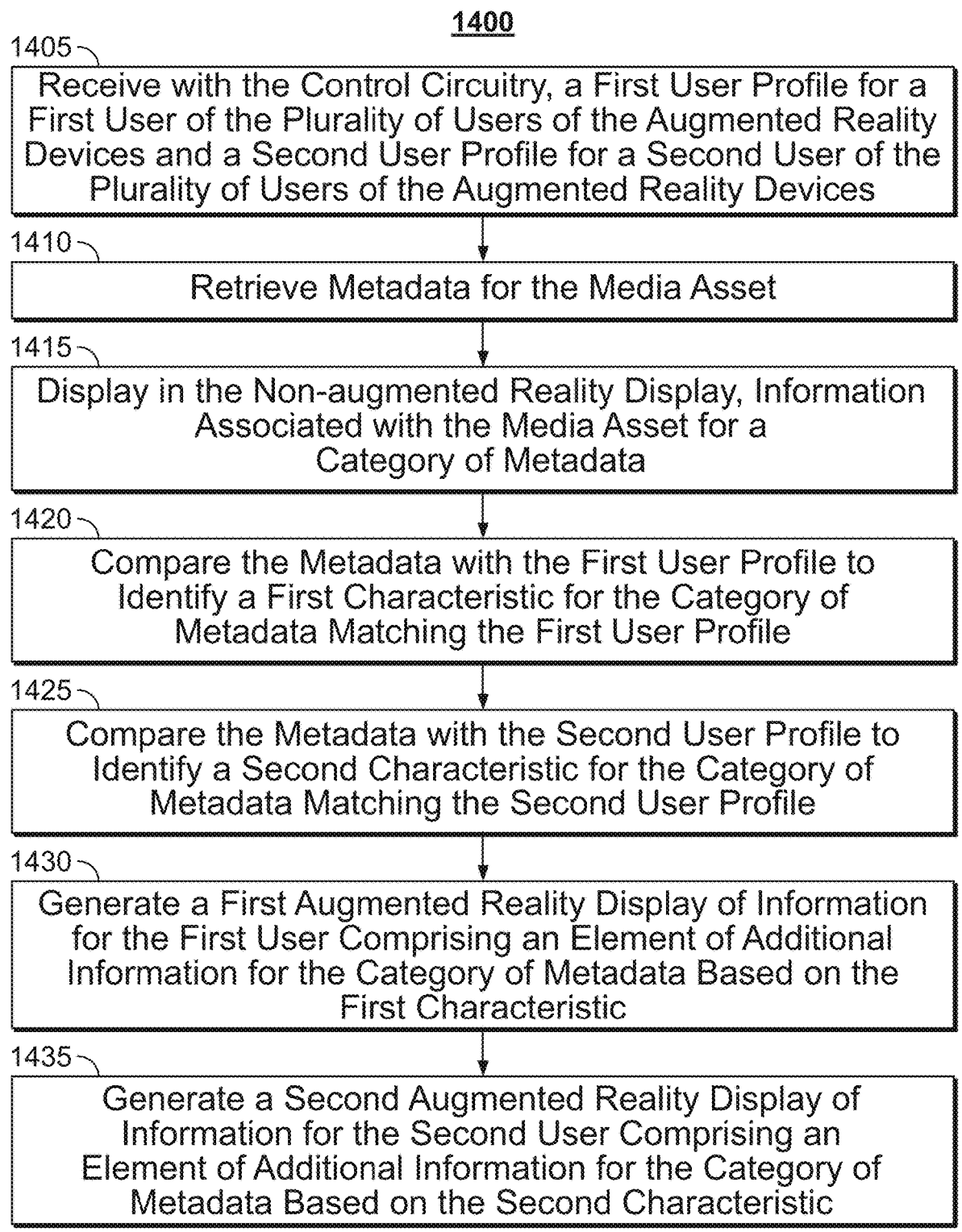
FIG. 14 is a flowchart of an illustrative process for selecting additional information to include in an augmented reality device display in accordance with some embodiments of the disclosure.

FIG. 14 is a flowchart of illustrative steps of a process 1400 for generating an augmented reality display in accordance with some embodiments of the disclosure. It should be noted that process 1400 or any step thereof could be performed on, or provided by, any of the devices shown in FIGS. 10-11. For example, process 1400 may be executed by control circuitry 1004 (FIG. 10) as instructed by a media guidance application implemented on a user device (e.g., user equipment devices 1102, 1104, and/or 1106 (FIG. 11)) to generate an augmented reality display. In addition, one or more steps of process 1400 may be incorporated into or combined with one or more steps of any other process or embodiment described herein.

FIG. 14 depicts a process 1400 for generating an augmented reality display for a user. For example, in the environment depicted in FIG. 1, on an AR device 130 or an AR application on a smartphone 120, a display may be generated having special features that are relevant to the user, for example a display as shown in FIGS. 3-4.

At step 1405, control circuitry 1004 for a media guidance application may receive a first user profile for a first user of an AR device. The user profile may be received from a database of information about users of the media guidance application. The user profile may be populated with information explicitly added by a user, or based on viewing history and selections made by the user. A second user profile for a second user of the AR devices may also be retrieved in the same manner by the control circuitry 1004 for the media guidance application. There may be a number of AR device users and so the control circuitry 1004 for the media guidance application may retrieve any number of user profiles that correspond to the respective users of the AR devices.

At step 1410, the control circuitry 1004 for the media guidance application may retrieve metadata for a media asset. The metadata may be obtained from a media database and may include data about the media asset. For example, the metadata may include information about the media asset genre, actors, description, director, episodic place, or other details.

At step 1415, the control circuitry 1004 for the media guidance application may display, in a non-augmented reality display, information associated with the media asset for a category of metadata. Thus, the control circuitry 1004 for the media guidance application may generate a display of information in a non-AR display for the media asset. An example of such display may be the standard program listings depicted in FIG. 2, which include a program title, and time and channel information, and could include other media information.

At step 1420, the control circuitry 1004 for the media guidance application may compare the metadata for the media asset with the first user profile to identify a first characteristic for the category of metadata matching the first user profile. In particular, the control circuitry 1004 for the media guidance application may compare data associated with the user profile which may indicate preferences for certain media categories, and within such media categories, preferences for particular characteristics. For example, in a media category for an actor, a user may prefer some over others. In another example, a user may prefer one sports team over another sports team. In an example, the media guidance application may compare actor information or program genre information with a user preference profile to find matching information that may be relevant for the user.

At step 1425, the control circuitry 1004 for the media guidance application may compare the metadata with the second user profile to identify a second characteristic for the category of metadata matching the second user profile. The media guidance application may compare the metadata with the second user profile to find a characteristic of the metadata that may match the second user's profile to find information that may be suitable for the second user. In environments where there are many users, the control circuitry 1004 for the media guidance application may repeat steps 1420 and 1425 as many times as is needed to find suitable information relevant to a respective user profile.

At step 1430, the control circuitry 1004 for the media guidance application may generate a first AR display of information for the first user comprising an element of additional information for the category of metadata based on the first characteristic. Thus, the media guidance application may use the matching category to provide additional information in an AR display that has a characteristic in common with the respective user's profile. For example, in FIG. 3, an AR display shows program listings with an actor named and pictured in the program listings because such actor is a favorite of the user.

At step 1435, the control circuitry 1004 for the media guidance application may generate a second AR display of information for the second user comprising an element of additional information for the category of metadata based on the second characteristic. Thus, another display for another user may be generated by the control circuitry 1004 for the media guidance application having additional information for a category of metadata that is relevant to the user. For example, as shown in FIG. 4, a user that likes the show "Seal Team" may be presented an AR display showing such show. The AR displays may be generated for as many users as are using AR devices using the same steps for process 1400.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 14.

Figure 15:
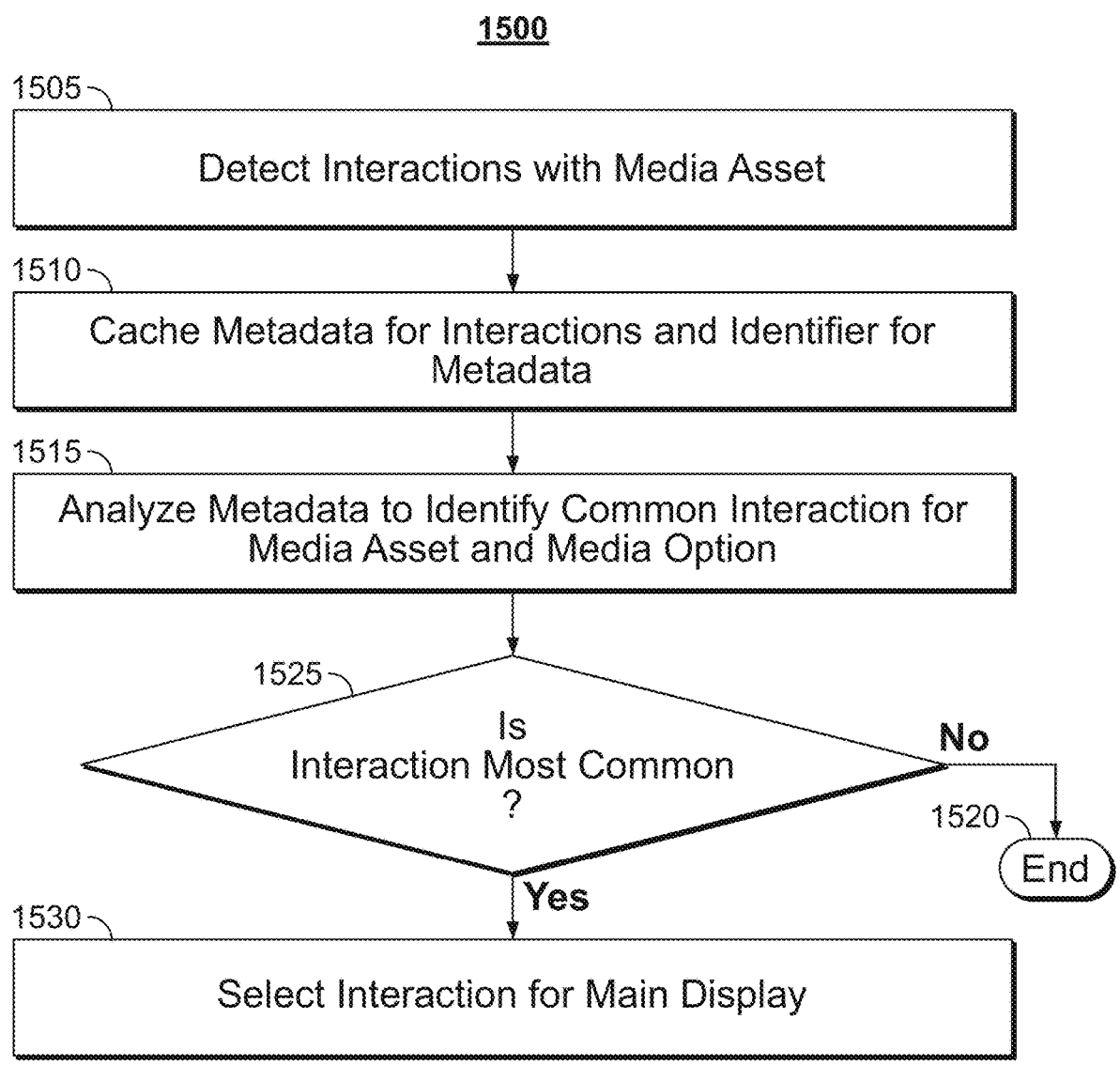
FIG. 15 is a flowchart of an illustrative process for selecting interactions in an augmented reality device display in accordance with some embodiments of the disclosure.

FIG. 15 is a flowchart of illustrative steps of a process 1500 for selecting interactions in an augmented reality device to add in an update to a non-augmented reality display in accordance with some embodiments of the disclosure. It should be noted that process 1500 or any step thereof could be performed on, or provided by, any of the devices shown in FIGS. 10-11. For example, process 1500 may be executed by control circuitry 1004 (FIG. 10) as instructed by a media guidance application implemented on a user device (e.g., user equipment devices 1102, 1104, and/or 1106 (FIG. 11)) to update a non-augmented reality display. In addition, one or more steps of process 1500 may be incorporated into or combined with one or more steps of any other process or embodiment described herein.

FIG. 15 depicts a process 1500 that may be followed to update a non-augmented reality device display with enhancements and interactions from an AR device display. FIG. 15 may be used in the environment shown in FIG. 1 or in any other environment where multiple viewers are watching media and some of those viewers have augmented reality devices or applications, and other viewers do not have augmented reality devices or applications.

At step 1505, the control circuitry 1004 for the media guidance application may detect interactions with a media asset. An interaction may be any type of media interaction that a user has in a media interface. Step 1505 may be performed using a media guidance application that is in communication with an AR device that shows information about a media asset. A user of the AR device may make selections in the media asset information to, for example, obtain further information or details about the media asset, access the media asset, save the media asset, or other selection. These selections and other actions may be considered media interactions. For example, a viewer viewing the display in FIG. 3 may make a selection in the image of Adam Levine 325 to obtain additional information about Adam Levine. In another example, a viewer viewing the display in FIG. 4 may make a selection in the cast details about "Seal Team" to find out more about the cast and episodes in which the cast member may appear. In another example, a viewer viewing the display in FIG. 4 may select the program "Seal Team" to save to a watchlist, or to access.

Such interactions with media may be stored by the control circuitry 1004 for the media guidance application. At step 1510, the control circuitry 1004 for the media guidance application may cache metadata for the user interactions as well as an identifier for metadata to identify the metadata and media asset related to the interaction. For example, an interaction with an actor for a program in a program listing may be cached with information about the actor, the program, and the action to seek information. In another example, an interaction to save a program to a watchlist may include metadata identifying the program and the action saving the program. Such information may be useful in identifying patterns of interactions.

At step 1515, the control circuitry 1004 for the media guidance application may analyze the cached metadata to identify a common interaction for a media asset and a media option. For example, multiple users may perform various interactions in their respective AR devices that are not related to interactions by other users. However, some users may perform the same actions—e.g., finding information, or saving a program—but perform those actions in connection with different media assets and different types of information for the media asset.

At step 1515, the control circuitry 1004 for the media guidance application may analyze the metadata to determine whether the interaction is common. A common interaction may be one that has the same action for the same media asset. In some scenarios, the interaction can be common when it is performed by more than one user, or a majority of users.

The interaction may be analyzed to determine whether it is common by the control circuitry 1004 for the media guidance application, at step 1525. If the interaction is not common, the process 1500 may end at 1520.

If, however, the interaction is determined to be common, meaning that it is performed by more than one user, and possibly a majority of users, the interaction may be selected at step 1530 by the control circuitry 1004 for the media guidance application to be added in an update to a main non-AR display. Thus, an interaction that is common among users of AR devices may be added to a non-AR display so that viewers without an AR device may see and experience the AR-enhanced displays.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 15.

Figure 16:
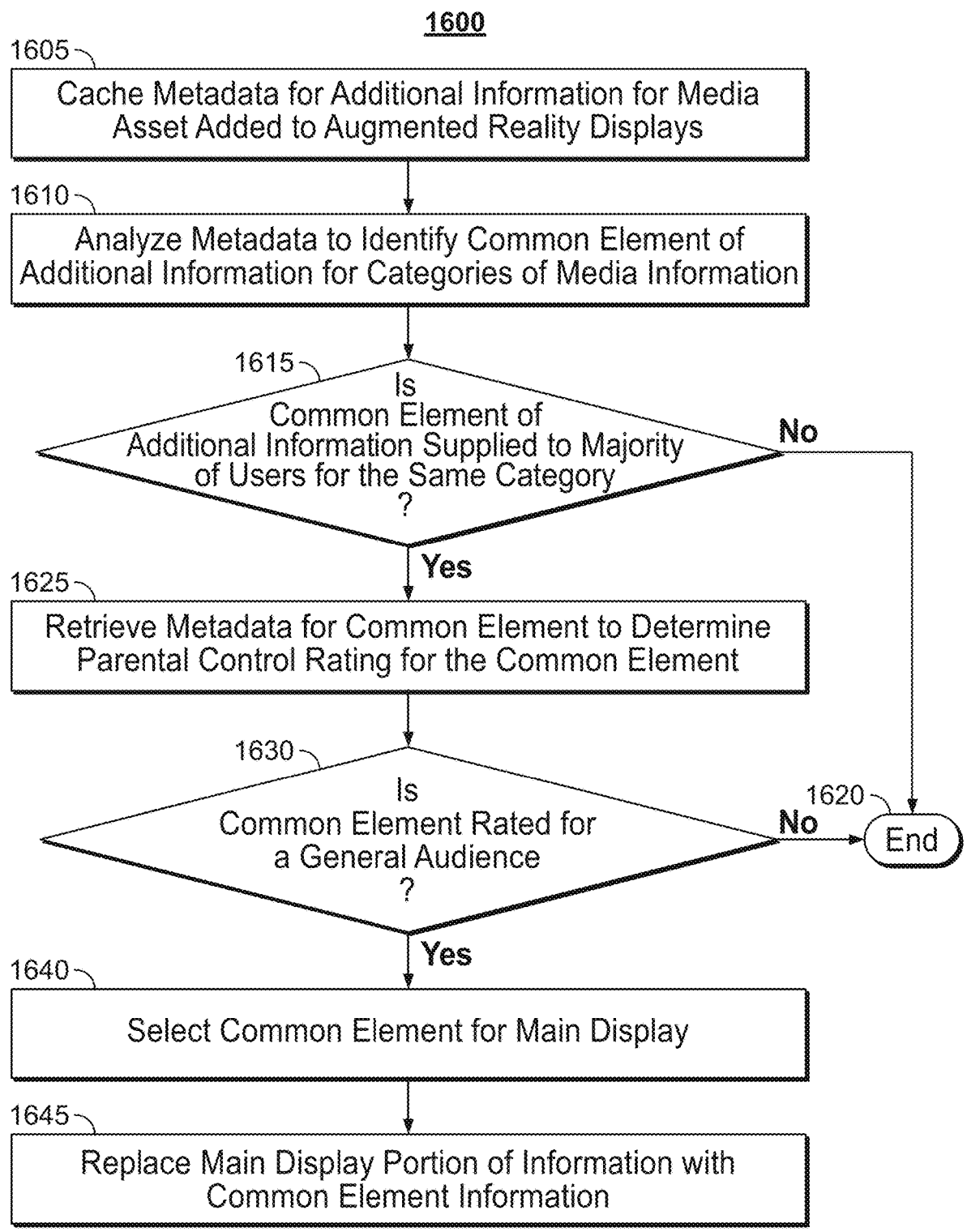
FIG. 16 is a flowchart of an illustrative process for selecting common elements in an augmented reality device display in accordance with some embodiments of the disclosure.

FIG. 16 is a flowchart of illustrative steps of a process 1600 for selecting elements to use in an update to a non-augmented reality display in accordance with some embodiments of the disclosure. It should be noted that process 1600 or any step thereof could be performed on, or provided by, any of the devices shown in FIGS. 10-11. For example, process 1600 may be executed by control circuitry 1004 (FIG. 10) as instructed by a media guidance application implemented on a user device (e.g., user equipment devices 1102, 1104, and/or 1106 (FIG. 11)) to update a non-augmented reality display. In addition, one or more steps of process 1600 may be incorporated into or combined with one or more steps of any other process or embodiment described herein.

FIG. 16 depicts a process 1600 for selecting elements from an AR display to add to update a non-AR display. Process 1600 may be used in a viewing environment in which there are multiple viewers of media and some of the viewers have AR devices or applications and other viewers do not have AR devices or applications. The non-AR device users may have the non-AR device updated with features from the AR displays.

At step 1605, the control circuitry 1004 for the media guidance application may retrieve from a cache of metadata additional information for a media asset that is used or added to an augmented reality display. Thus, the media guidance application may collect any additional information used to generate an AR display. For example, the additional information used to show additions to the program listings in FIGS. 3-4 may be retrieved and cached by the media guidance application.

At step 1610, the control circuitry 1004 for the media guidance application may analyze the metadata to identify a common element of the additional information. In particular, the control circuitry 1004 for the media guidance application may analyze the metadata to identify categories of media information used in the additional information. For example, for users having additional information added to AR displays for a particular team in a sporting event, or for a particular actor in a show included in a program listing, such categories of information may be analyzed to find common and overlapping additions of information for media. Using categories of information can be helpful in finding common elements when AR displays are generated to be specific to a particular user for whom there are no common matches of information among a group of users. Thus, a media guidance application may be able to match additional information using a broader grouping of metadata, such as a sports team, or an actor, rather than a sports team and a particular player and icons or colors, or other specific preferences that may be used for a user's AR display.

At step 1615, the control circuitry 1004 for the media guidance application may analyze the metadata to determine whether there is a common element of additional information supplied to a majority of users for the same category of metadata. Thus, the control circuitry 1004 for the media guidance application may analyze the additional information metadata to find broad groups of data and determine whether the data was supplied in a majority of AR displays. If there is no common element, the process 1600 may end at 1620.

If the control circuitry 1004 for the media guidance application can find a common element among the additional information based on the metadata comparison, then such common element may have some broad appeal to a wider audience of viewers and may be suitable to apply in an update to a non-AR device. To ensure that the common element should be added, the control circuitry 1004 for the media guidance application may retrieve, at step 1625, metadata for the common element to determine a parental control rating for the common element.

At step 1630, the control circuitry 1004 for the media guidance application may check that the common element is rated for a general audience. If it is not, the process may end and the common element may not be used to update the non-AR device display. In some scenarios, a media guidance application may be programmed to skip this step when parental controls are not needed.

At step 1640, if the common element is rated for a general audience, the common element may be selected by the control circuitry 1004 for the media guidance application to use for updating the main display in the non-AR device display. Thus, for example, as shown in FIG. 6, additional details and features from an AR display may be updated to be shown in the non-AR device.

At step 1645, the control circuitry 1004 for the media guidance application may update the non-AR device by replacing a portion of the main display that corresponds to the common element with the information from the common element. Thus, a program listing display as shown in FIG. 2 may be replaced with additional programming details in FIG. 6.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 16.

Figure 17:
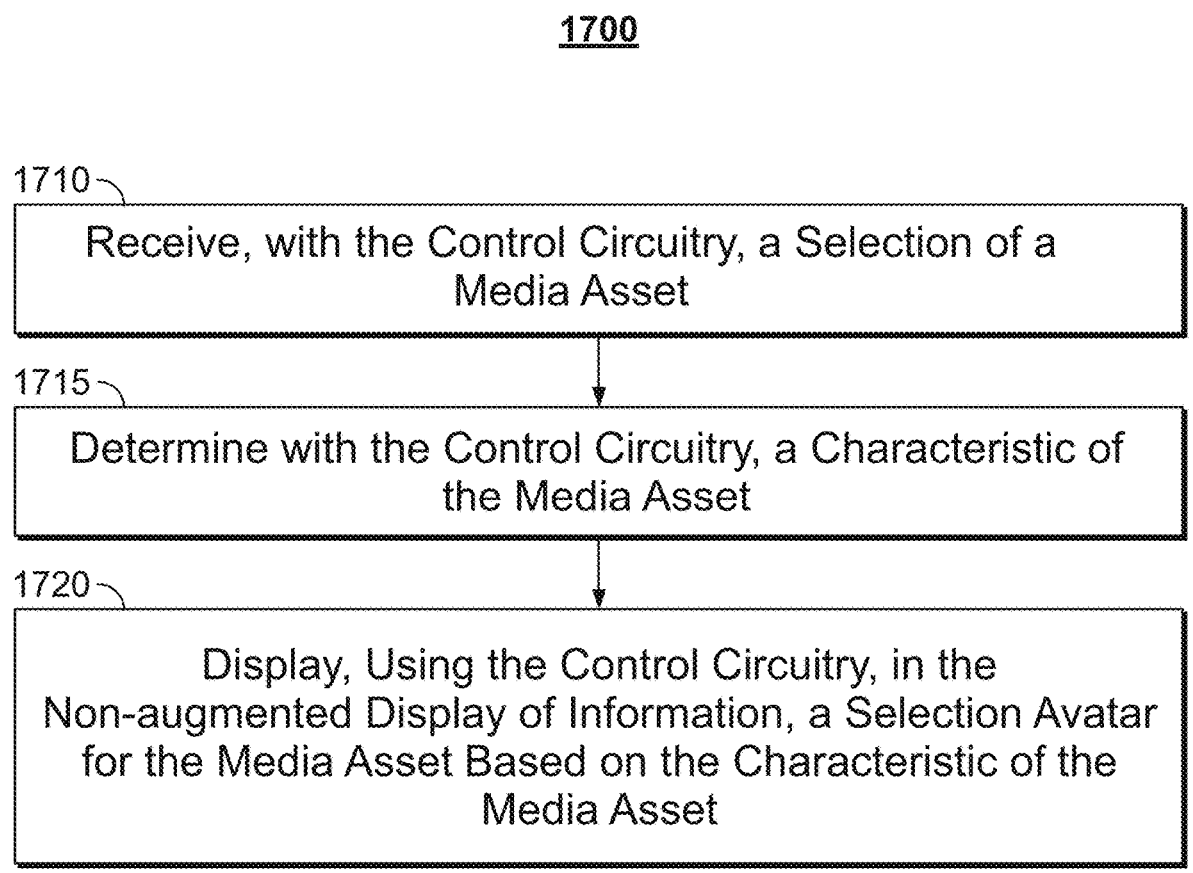
FIG. 17 is a flowchart of an illustrative process for selecting a selection avatar and animation for a non-augmented reality device display in accordance with some embodiments of the disclosure.

FIG. 17 is a flowchart of illustrative steps of a process 1700 for updating a non-augmented reality display in accordance with some embodiments of the disclosure. It should be noted that process 1700 or any step thereof could be performed on, or provided by, any of the devices shown in FIGS. 10-11. For example, process 1700 may be executed by control circuitry 1004 (FIG. 10) as instructed by a media guidance application implemented on a user device (e.g., user equipment devices 1102, 1104, and/or 1106 (FIG. 11)) to update a non-augmented reality display. In addition, one or more steps of process 1700 may be incorporated into or combined with one or more steps of any other process or embodiment described herein.

FIG. 17 depicts a process 1700 for using a selection avatar and selection animation in a non-AR device. When a user interacts with a non-AR display, it may be appealing to the user to provide selection features for the media using avatars and icons that are related to the media. For example, as shown in FIG. 7, a microphone icon 730 may be shown to select a singing show "The Voice." And a music-related animation 735 may be used to show that the singing show "The Voice" has been selected.

At step 1710, the control circuitry 1004 for the media guidance application may receive a selection of a media asset. The media asset selection may be made via the media guidance application using a user interface that may involve using a voice command or pointer to select or hover over the media asset listing in a program listing.

At step 1715, the control circuitry 1004 for the media guidance application may determine a characteristic of the media asset. Media asset characteristics may be obtained from metadata for the media asset. In general, a characteristic for this purpose may be a genre for the media asset. In some scenarios, the characteristic may be a category that can identify the media asset. For example, for a sporting event, a particular team or sport may be identifying. For a music-related event, a musical characteristic may be a suitable identifier. For a news program, the news characteristic may be identifying, or a producer or focus of the program may be an identifier.

At step 1720, the control circuitry 1004 for the media guidance application may display, in the non-augmented display of information, a selection avatar for the media asset based on the characteristic of the media asset. Thus, as shown in FIG. 7, a selection avatar of a microphone 730 may be used to select a music-related show, such as "The Voice." In addition, a music animation 735 may be used to show a selection of "The Voice" has been made. Other types of avatars and animations may be used as are suitable for the particular media asset.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 17.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for displaying information about an object using augmented reality, the method comprising:
   retrieving, from a database, information associated with the object;
   generating a non-augmented reality display of the information associated with the object;
   retrieving, from the database, additional information associated with the object based on a user preference for the respective user of the augmented reality device;
   providing in a plurality of augmented reality devices, an augmented reality display of the information associated with the object, wherein the augmented reality display in each respective one of the plurality of augmented reality devices comprises the additional information associated with the object based on the user preference of a respective user accessing one of the plurality of augmented reality devices;
   determining a common element of the additional information provided for any of the users of the plurality of augmented reality devices;
   analyzing the additional information provided for each of the respective users of the plurality of the augmented reality devices to determine the common element of the additional information provided in the plurality of the augmented reality devices;
   receiving a plurality of interactions from any of the users of the plurality of augmented reality devices;
   detecting a common interaction among the plurality of interactions; and
   updating the non-augmented reality display of information based on the common element of the additional information and the common interaction.

2. The method of claim 1, wherein determining the common element comprises selecting the common element of the additional information, the common element provided for at least two of the respective users of the plurality of augmented reality devices.

3. The method of claim 2, wherein selecting the common element comprises selecting an element of the additional information provided for a majority of the respective users of the plurality of augmented reality devices.

4. The method of claim 2, wherein selecting the common element comprises:
   caching metadata associated with any of the additional information provided for each respective one of the plurality of augmented reality displays;
   analyzing the metadata to identify a characteristic of the additional information and the object; and
   selecting the additional information used for a same characteristic in a majority of the plurality of augmented reality displays, as the common element.

5. The method of claim 1, wherein the common interaction comprises an interaction performed with the information associated with the object or the additional information associated with the object by a majority of the respective users of the plurality of augmented reality devices.

6. The method of claim 1, wherein detecting the common interaction among the plurality of interactions comprises:
   caching metadata associated with the plurality of interactions, the metadata comprising an identifier for the object associated with the respective interaction and an option associated with the interaction; and
   analyzing the metadata to identify the common interaction based on the object and the option.

7. The method of claim 1, wherein updating the non-augmented reality display comprises replacing in a main display a portion of information associated with the object with the common element and adding the common interaction to the main display.

8. The method of claim 1, wherein providing in the plurality of augmented reality devices, the augmented reality display of the information associated with the object comprises:
   receiving a first user profile for a first user of the plurality of users of the augmented reality devices and a second user profile for a second user of the plurality of users of the augmented reality devices;
   retrieving metadata for the object;
   displaying in the non-augmented reality display, information associated with the object for a category of metadata;
   comparing the metadata with the first user profile to identify a first characteristic for the category of metadata matching the first user profile;

comparing the metadata with the second user profile to identify a second characteristic for the category of metadata matching the second user profile;

generating a first augmented reality display of information for the first user comprising an element of additional information for the category of metadata based on the first characteristic; and generating a second augmented reality display of information for the second user comprising an element of additional information for the category of metadata based on the second characteristic.

9. The method of claim 1, wherein updating the non-augmented reality display comprises:

generating a picture-in-picture window in the non-augmented reality display, the picture-in-picture window overlaying a main display, and comprising the updates to the information associated with the object.

10. A system for displaying information about an object using augmented reality, the system comprising:

input/output (I/O) interface circuitry configured to receive a user input; and control circuitry configured to:

retrieve, from a database, information associated with the object;

generate a non-augmented reality display of the information associated with the object;

retrieve, from the database, additional information associated with the object based on a user preference for the respective user of an augmented reality device;

provide in a plurality of augmented reality devices, an augmented reality display of the information associated with the object, wherein the augmented reality display in each respective one of the plurality of augmented reality devices comprises the additional information associated with the object based on the user preference of a respective user accessing one of the plurality of augmented reality devices;

determine a common element of the additional information provided for any of the users of the plurality of augmented reality devices;

analyze the additional information provided for each of the respective users of the plurality of the augmented reality devices to determine the common element of the additional information provided in the plurality of the augmented reality devices;

receive a plurality of interactions from any of the users of the plurality of augmented reality devices;

detect a common interaction among the plurality of interactions; and update the non-augmented reality display of information based on the common element of the additional information and the common interaction.

11. The system of claim 10, wherein the control circuitry, when determining the common element, is configured to select the common element of the additional information, the common element provided for at least two of the respective users of the plurality of augmented reality devices.

12. The system of claim 11, wherein the control circuitry, when selecting the common element, is configured to select an element of the additional information provided for a majority of the respective users of the plurality of augmented reality devices.

13. The system of claim 11, wherein the control circuitry, when selecting the common element, is configured to:

cache metadata associated with any of the additional information provided for each respective one of the plurality of augmented reality displays;

analyze the metadata to identify a characteristic of the additional information and the object; and select the additional information used for a same characteristic in a majority of the plurality of augmented reality displays, as the common element.

14. The system of claim 10, wherein the common interaction comprises an interaction performed with the information associated with the object or the additional information associated with the object by a majority of the respective users of the plurality of augmented reality devices.

15. The system of claim 10, wherein the control circuitry, when detecting the common interaction among the plurality of interactions, is configured to:

cache metadata associated with the plurality of interactions received at the control circuitry, the metadata comprising an identifier for the object associated with the respective interaction and an option associated with the interaction; and analyze the metadata to identify the common interaction based on the object and the option.

16. The system of claim 10, wherein the control circuitry, when updating the non-augmented reality display, is configured to replace in a main display a portion of information associated with the object with the common element and add the common interaction to the main display.

17. The system of claim 10, wherein the control circuitry, when providing in the plurality of augmented reality devices, is configured to:

receive a first user profile for a first user of the plurality of users of the augmented reality devices and a second user profile for a second user of the plurality of users of the augmented reality devices;

retrieve metadata for the object;

display in the non-augmented reality display, information associated with the object for a category of metadata;

compare the metadata with the first user profile to identify a first characteristic for the category of metadata matching the first user profile;

compare the metadata with the second user profile to identify a second characteristic for the category of metadata matching the second user profile;

generate a first augmented reality display of information for the first user comprising an element of additional information for the category of metadata based on the first characteristic; and generate a second augmented reality display of information for the second user comprising an element of additional information for the category of metadata based on the second characteristic.

18. The system of claim 10, wherein the control circuitry, when updating the non-augmented reality display, is configured to generate a picture-in-picture window in the non-augmented reality display, the picture-in-picture window overlaying a main display, and comprising the updates to the information associated with the object.

* * * * *